United States Patent [19]

Schuett et al.

[11] Patent Number: 4,647,114
[45] Date of Patent: Mar. 3, 1987

[54] HYDRAULIC BRAKE SYSTEM

[75] Inventors: Bernd Schuett, Oberursel; Martin Kronenberg, Schmitten, both of Fed. Rep. of Germany

[73] Assignee: Alfred Teves GmbH, Frankfurt am Main, Fed. Rep. of Germany

[21] Appl. No.: 737,817

[22] Filed: May 23, 1985

[30] Foreign Application Priority Data

May 24, 1984 [DE] Fed. Rep. of Germany ....... 3419311

[51] Int. Cl.$^4$ .............................................. B60T 8/26
[52] U.S. Cl. ..................................... 303/92; 303/6 C
[58] Field of Search .................... 303/6 C, 6 R, 84 R, 303/92

[56] References Cited

U.S. PATENT DOCUMENTS 4,494,801  1/1985  Ohmori et al. ........................ 303/92
4,499,543  2/1985  Matsuda ............................ 303/92 X

*Primary Examiner*—Duane A. Reger
*Attorney, Agent, or Firm*—James B. Raden; William J. Michals

[57] ABSTRACT

A hydraulic brake system for automotive vehicles comprises a master cylinder (4) with at least two working chambers (3,5) and comprising at least two brake circuits. A first brake circuit is in constant hydraulic communication with a first working chamber (3) of the master cylinder (4), while a second brake circuit is connected to the second working chamber (5) of the master cylinder (4). A pressure control valve (1) is inserted into the connection between the working chamber (5) and the second brake circuit, the valve enabling to take influence on the pressure in the second brake circuit in a predeterminable fashion. The pressure control valve (1) is switchable by a slip monitoring electronics (62) so that braking pressure control in the second brake circuit will take place exclusively in the event of failure of the brake slip control apparatus. Thereby, the pressure variation in the wheel brakes, which is performed in a known fashion by suitable change-over of solenoid valves, will not be influenced negatively by the pressure control unit (1) when the brake slip control apparatus is intact.

8 Claims, 1 Drawing Figure

U.S. Patent    Mar. 3, 1987    4,647,114
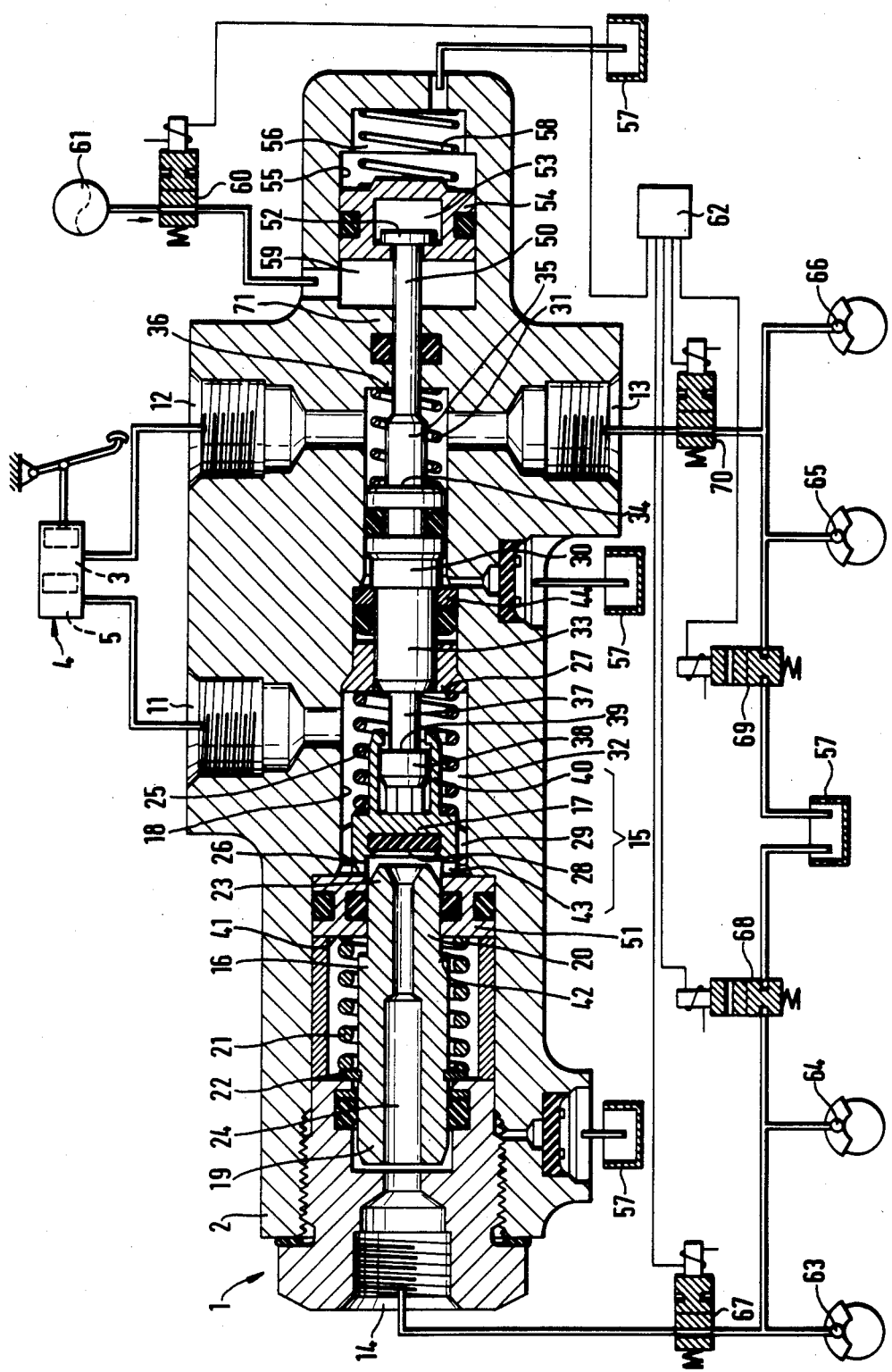

HYDRAULIC BRAKE SYSTEM

BACKGROUND OF THE INVENTION:

The present invention relates to a hydraulic brake system for automotive vehicles comprising a master cylinder containing at least two working chambers, and at least two brake circuits. A first brake circuit is in constant hydraulic communication with a first working chamber of the master cylinder, while a pressure control valve is inserted in a second brake circuit connected to the second working chamber. The valve is influenced by the pressure in the second brake circuit in a predeterminable fashion.

In Germany patent application No. 29 26 499, a braking pressure control unit for vehicle brake systems in disclosed through which a first brake circuit, preferably that brake circuit allocated to the front-wheel brakes, is in permanent hydraulic communication with a working chamber of a tandem master cylinder. A second brake circuit is allocated to the wheel brakes of the rear axle of the automotive vehicle and is connected to a second working chamber of the tandem master cylinder. The hydraulic pressure in the brake circuit allocated to the rear-wheel brakes is influenced in a predetermined manner. In excess of a predefined pressure in the front-wheel brakes, the pressure supplied to the rear-wheel brakes is reduced so that the pressure prevailing in the rear-wheel brakes will rise less quickly in relation to the front-wheel braking pressure when the brake is applied. Braking pressure control units of this type are meant to prevent overbraking of the rear wheels which usually results in unstable driving conditions.

Anti-lock systems are also known wherein pressure fluid is removed from the wheel brakes and returned to an unpressurized supply reservoir in the presence of critical slip values. Likewise in such brake systems, overbraking of the wheels at the rear axle of an automotive vehicle is precluded to a large extent.

In hydraulic brake systems in which there is provision of both a braking pressure control valve and a braking pressure control by means of pressure fluid removal from the wheel brakes, there is frequently the disadvantage in practical operation that, during brake slip control, the braking pressure variation in the wheel brakes is adversely effected by the braking pressure control unit. The reason for this is that the solenoid valves allocated to the wheel brakes has a relatively high switching frequency which the braking pressure control unit is not able to easily follow, particularly due to the forces due to inertia. Therefore, in operation of the brake slip control apparatus, there may occur a braking pressure variation in the wheel brakes which is not desired. On the other hand, owing to a brake slip control apparatus, the braking pressure in the wheel brakes of the rear axle is controlled so as to reliably preclude overbraking.

Therefore, it is an object of the present invention to provide a hydraulic brake system wherein the braking pressure characteristic curve is not influenced by the braking pressure control unit during brake slip control.

SUMMARY OF THE INVENTION

This object is achieved according to the present invention wherein the pressure control valve is adapted to be switched by a slip monitoring electronics such that braking pressure control in the second brake circuit will take place exclusively in the event of failure of the brake slip control apparatus. During normal brake operation and when the brake slip control apparatus is intact, the pressure control valve is hence de-activated so that there is free hydraulic communication between the master cylinder and wheel brakes of the rear axle. As long as the brake slip control apparatus is intact, overbraking of the wheel brakes allocated to the rear axle of the automotive vehicle is caused exclusively by a pressure modulation in the corresponding wheel brakes, while the wheel brakes are associated in a known manner with solenoid valves which are controllable by a slip monitoring electronics and through which pressure fluid can be removed from the wheel brakes. As soon as the brake slip control apparatus has a defect, the pressure control valve will be switched on so that, in excess of a predetermined switching pressure, the braking pressure in the wheel brakes of the rear axle rises less in relation to the rise of the braking pressure in the wheel brakes of the front axle. Thus the pressure control valve will not be negatively influenced by the variation of the braking pressure in the wheel brakes during operation of the brake slip control apparatus.

In one embodiment the pressure control valve is adapted to be de-activated by the pressure of an auxiliary pressure source. In this connection, an advantageous embodiment is provided if a valve passage of the pressure control valve communicates with a piston slidable in an axial bore and a first end surface of the piston is adapted to be acted upon by the pressure of the auxiliary pressure source in the direction of opening of the valve passage of the pressure control valve, and a compression spring is provided on a second end surface which counteracts the pressure force. In this arrangement, the piston is preferably slidable by a predeterminable distance in relation to a tappet controlling the valve passage. Accordingly, if the auxiliary pressure source is under a heavy demand during a brake slip control action and the pressure of the auxiliary pressure source falls correspondingly, operation of the control valve is precluded.

In another embodiment of a normally opened three-way/two-position directional control valve is arranged between the auxiliary pressure source and the pressurizable end surface of the piston, which valve can be switched to a closed position by the slip monitoring electronics. As long as the brake slip control apparatus is in proper working order, the three-way/two-position directional control valve assumes a position in which the auxiliary pressure source is connected to the pressurizable surface of the piston. As soon as the monitoring electronics recognizes an out-of-order condition within the brake slip control apparatus, the three-way/two-position directional control valve will be switched over so that the hydraulic connection between the auxiliary pressure source and the pressurizable surface of the piston is closed. In this respect, it is preferred that the three-way/two-position directional control valve is controllable electromagnetically. Preferably, the three-way/two-position directional control valve is integrated into the housing of the pressure control valve, a relatively compact construction unit resulting therefrom.

BRIEF DESCRIPTION OF THE DRAWING

One embodiment of the present invention will be described in more detail hereinafter in conjunction with the drawing wherein the single FIGURE illustrates a hydraulic brake cylinder system in accordance with the present invention.

DETAILED DESCRIPTION

In the drawing, reference numeral 1 designates a pressure control unit, in which the movable parts are accommodated in a housing 2. The housing 2 contains channels 11 to 14. The ports and channels 13 thereof are connected to the brake cylinders of the front axle, while the channels 14 are in communication with the brake cylinders of the rear axle. A first pressure chamber 3 of a tandem master cylinder 4 is in communication with the channel 12 and a second pressure chamber 5 communicates with the channel 11. Arranged between the master cylinder port 11 and the rear-axle port 14 allocated thereto is a pressure control valve 15, the closure member of which is designed as a stepped regulating or control piston 16, and the valve seat 17 of which is a one-part or multi-part element. All details are set forth in the drawing. Hence, the two parts 16 and 17 are substantially rotationally symmetrical bodies which are allocated coaxially relative to one another and to the stepped bore 18 receiving them. Bore 18 is subdivided in a known fashion into chambers to accommodate the individual parts, the subdivision being effected by means of seals, stops, screw plugs, circlips and bore portion of varying diameter.

The left-hand portion 19 of the piston 16 that is allocated to the rear-axle outlet 14 is of larger diameter than its right-hand portion 20. It is coaxially penetrated (channel 24). The drawing displays this piston 16 in its left-hand end position into which it is urged by a helical spring 21. On the right hand, said spring 21 takes support on a part which is to be considered as part of the housing (an annular washer), and on the left hand, it is supported on a circlip 22 inserted into the piston 16 and serving as a spring support. With its left surface, said circlip 22 abuts on the left end wall of the spring compartment receiving the spring 21. The right end 23 of the piston 16, the diameter whereof is smaller than that of the left piston portion 19, is designed as a sealing edge around the port of the axial channel 24. This frontal sealing edge is placed opposite to the valve seat member 17 movable in the housing 2 and coacts with said member 17—depending on its position—to throttle or close the channel. Said valve seat member 17 is at its outer periphery guided in an axial direction on the chamber wall or bore wall, but is not sealed thereto. To ensure fluid flow, grooves 29 are pierced into the cylindrical outer surface of the valve seat member and extend in the direction of the peripheral cylinder lines of said member. Besides, said member 17 disposes of projections 43 on its end surface close to the piston 16 on a radius lying outside of the radius of the right piston portion 20, and disposes of interspaces between said projections which together enable the member to move with these projections 43 into abutment on a radial stop surface 26 of the sleeve 51, without inhibiting the free fluid flow thereby. The valve seat member is urged to assume this stop position by a valve spring in the form of a helical spring 25 which, on its right side, takes support on a radial stop surface 27. The inner portion 28 of the end surface of the movable member 17 forms the seat for the sealing edge at the piston end 23. Portion 28 may, if desired, be resilient in nature as shown in the drawing.

The same bore which crosses the channel extending between the two ports 12 and 13 accommodates coaxially relative to the elements described hereinabove another stepped piston 30, having the capacity of a pressure probe, onto which piston a spring 31 is constantly acting so as to push the piston 30 to the left. The chamber 32 receiving the valve seat member 17 is in permanent communication with the master or actuating cylinder. The smaller cross-sectional surface of the stepped piston 30 faces chamber 32, which surface corresponds to the diameter of the left piston portion 33. The end surface 34 of the piston 30 facing the opposite direction is larger than its end surface acted upon from out of the chamber 32. Consequently, in addition to the spring 31, the force due to the pressure in the chamber 32 is opposed by the force of the pressure in the channel 12, 13 by way of the correspondingly larger end surface 34. The movement of the piston to the right is limited by a coaxial peg 35 facing to the right. The boundary to the left is determined by a step in the piston and by a corresponding ring 44, because when the ring 44 is reached, the effectively pressurized surface of the piston 30 that is close to the chamber 32 will be increased by the surface of ring 44.

The components 30, 17 and 16 are displaceable in an axial direction. There is a follower mechanism or coupling engagement between the components 17 and 30. At the end surface of the portion 33 of the piston 30, neck 37 is projecting in an axial direction on which a head 38 with greater diameter is seated. The transition from neck 37 to head 38 is performed as step 39, and this step is hooked from behind by corresponding mating steps at the end of fingers 40 showing to the right in an axial direction, the said fingers protruding as a crown ring on a radius on the backside of the said member. For the assembly, the head 38 which is correspondingly chamfered on its left end surface can be pressed easily into the space between the fingers 40 and is held there. The clearance of motion, in an axial direction, of this head in the cage formed by the fingers 40 is defined by the axial distance between the barbed steps of the fingers and the right end surface of the member 17 in relation to the axial extension of the head 38 between its step 39 and its front head surface which is abutting in the middle of the member 17.

The mode of operation of the pressure control unit 1 is as follows:

In the inactive position shown, admittedly, the hollow spaces in the housing, that is the chamber and inlets, are filled with pressure fluid, but are unpressurized. In any case, it is only the spring forces which practically act, as is illustrated, and all three movable components 16, 17 and 30 are placed on their left-hand stops. In this arrangement, the dimensions are chosen such that the sealing edge at 23 is not seated on its valve seat surface 28, whereby there is a free passage between the ports 11 and 14. Likewise the valve seat member 17 and the stepped piston 30 are without axial engagement herein; and this will not be changed as long as the product of the pressure in the channel 12, 13 and the cross-section of the surface 34 plus the force exerted by the spring 31 is greater than the product of the pressure in the inlet 11 and the cross-sectional surface of the piston portion 33. Hence follows that, if pressure is supplied to the inlets 11 and 12 by the actuating or master cylinder 4 for the purpose of brake application, the above-mentioned precondition is fulfilled and the position of the piston will not be changed.

The pressure fluid at the inlet 11 is permitted to propagate practically unhindered past the member 17 through the parts 43 in its contacting stop surface 26 and from there into the axial bore 24 of the piston 16 and thus through the outlet 14 to the rear-axle brake cylinders. The pressure developing in the outlet 14 exerts an increasing resultant pressure force on the stepped piston 16 in consequence of the ratio of the cross-sectional surfaces of the piston portions 19 and 20, whereby the said stepped piston is caused to move to the right in opposition to the force of the spring 21 and to close the pressure fluid passage 24 (axial channel) due to the sealing edge abutting at 23 on the valve seat surface 28. With the pressure on the inlet side continuing to rise, there will occur on the outlet side a pressure increase which is reduced corresponding to the ratio of surfaces of the stepped piston 16 (control piston).

A like embodiment has a result that the braking pressure distribution onto the two axles is identical in the beginning, but will be changed starting from a certain point in terms of the rear-axle braking pressure rising less in relation to the front-axle braking pressure.

When the front-axle circuit becomes de-pressurized due to rupture of a brake line, for instance, while an actuating pressure is maintained, the channel 12, 13 becomes pressureless, and the pressure from the actuating cylinder which prevails in the chamber 32, 11 displaces the piston 30 to the right in opposition to the force of the spring 31. The same will also happen, if the front-axle brake circuit does not become unpressurized, but if there is merely a difference in pressure. In each of these cases, the valve seat member 17 will be entrained to the right by the follower mechanism and dragging engagement 38, 17, whereby the valve seat surface 28 is moved away from the sealing edge 23. The course of motion of the stepped piston 16, defined by the axial distance of the step 42 of the piston 20 from the step's associated stop surface 41, is smaller than the space remaining between the bottom 36 and the right stop end (at peg 35) of the piston 30. If it is assumed that the head 38 and the end hooks of the fingers 40 are in engagement already, the piston 30 entrains the valve seat member 17 by the amount of distance between 36 and 35 and, in doing so, lifts the valve seat surface 28 in any case from the sealing edge 23 because the piston 16 is not able to follow so far. Thereby, throttling between the ports 11 and 14 is directly eliminated so that the entire actuating pressure will reach the rear-axle brake cylinders without delay.

That is to say, the pressure control unit described characterizes in terms of function in that, with the unit being fail-free, the entire and unthrottled actuating pressure will be supplied into both brake circuits upon commencement of braking, and that the pressure delivery to the one brake circuit, that is the rear-axle brake circuit in the case described, will be throttled or choked only somewhat later. At any time during this process and irrespective of the reason thereof, breakage in the other brake circuit 12, 13 or de-pressurization whatsoever and already a pressure decrease will result in an immediate complete opening of the pressure fluid conduit of the first brake circuit (for example the rear-axle brake circuit).

When the brake circuits are intact and a braking action is to be terminated, what is performed by reduction of the actuating pressure, the valve spring 25 determines substantially the difference of the pressures at 14 and 11 which is required to open the brake circuit 14, 24, since these pressure act in opposition to one another practically by way of the same surface, namely by way of the surface enclosed by the sealing edge at 23 and 28. The differential of pressure desired will be obtained by rating of the spring 25. If the front-wheel brake circuit 12, 13 is not equipped with a similar regulating valve, the two brake circuits will be unsymmetrical in hydraulical respect, too. From the beginning of braking until attainment of a predetermined pressure, the pressure increase in both brake circuits is alike, while upon further increase, the pressure rises less strongly, in the rear-axle circuit than in the front-axle circuit. During the process of brake release, the pressure in the rear-axle brake circuit follows the pressure in the front-axle brake circuit with a certain delay.

Furthermore, it can be seen by reference to the drawing that shaped at the peg 35 is a tappet 50 which penetrates a housing wall 71 in sealed relationship therewith and which is furnished with an enlarged head 52 at its right-hand end, when viewing in the drawing. Said enlarged head 52 of the tappet 50 is arranged in a blind-end bore 53 of a piston 54, the said piston 54 being guided in a housing bore 55 which extends substantially coaxially relative to the other slidable elements. The right end surface of the piston 54, when viewing in the drawing, confines a housing chamber 56 which is in permanent communication with an unpressurized supply reservoir 57 and which accommodates a compression spring 58, the said compression spring 58 bearing against the boundary, that is right in the illustration, of the housing chamber 56, on the one hand, and against the piston 54, on the other hand. In contrast thereto, the left end surface of the piston 54, when viewing in the drawing, confines a chamber 59 which is connected to an auxiliary pressure source 61 by way of housing channels and an electromagnetically actuable three-way/two-position directional control valve 60. Said three-way/two position directionally control valve 60 normally assumes a position, in which there is communication between the auxiliary pressure source 61 and the housing chamber 59, and the piston has adopted an end position, which on the right when viewing in the drawing, dependent on the force of the compression spring 58.

The electromagnetically actuable three-way/two-position directional control valve 60 is switchable by a slip monitoring electronics 62, and an actuation of the exciter coil of the three-way/two-position directional control valve 60 will take place exclusively in the event of the slip monitoring electronics 62 detecting a defect in the brake slip control apparatus.

A like pressurization of the piston 54 has as a consequence that there will be permanent opening of the valve passage of the pressure control unit 1 so that said pressure control unit 1 is de-activated in terms of function as long as there is orderly operation of the anti-locking apparatus. As long as there is fail-free operation of said anti-locking apparatus, braking pressure modulation in the wheel brakes 63, 64 of the rear axle and in the wheel brakes 65, 66 of the front axle is performed through solenoid valves 67, 68, 69, 70 which are controllable by the slip monitoring electronics 62. The solenoid valves 67, 70 are opened in the de-energized state, while the solenoid valves 68, 69 assume a closed position in the de-energized state.

Hence, it follows from the foregoing that, with the anti-locking apparatus duly operating, the control unit 1 will be influenced by means of the piston 54 so as to permanently provide a free hydraulic passage between the working chambers 3, 5 of the tandem master cylinder 4 and the solenoid valves 67, 70 and, respectively, the wheel brakes 63, 64, 65, 66. As soon as the monitoring electronics 62 recognizes any out-or-order condition within the anti-locking apparatus, the three-way/two-positional directional control valve 60 will be actuated so that this three-way/two-position directional control valve 60 will assume a closed position. Due to the force of the compression spring 58 and the pressures which can be developed within the control unit 1, the piston 54 will move to the left, when viewed in the drawing, thereby enabling the control unit 1 to operate in the manner described hereinabove.

When is claimed is:

1. A hydraulic brake system for automotive vehicles having a master cylinder containing at least two working chambers and including at least two brake circuits, a first brake circuit thereof being in constant hydraulic communication with the first working chamber of said master cylinder, a pressure control valve means positioned in a second brake circuit connected to the second working chamber of said master cylinder, said valve means adapted to control the pressure in the second brake circuit in a predeterminable fashion, a slip monitoring electronic means (62) connected to and controlling suitable valve means for pressure actuation of said pressure control valve (1) so that braking pressure control in the second brake circuit will take place exclusively at said master cylinder in the event of failure of the brake slip control apparatus.

2. A hydraulic brake system as claimed in claim 1, wherein the pressure control valve (1) is adapted to be de-activated by said suitable valve means (60) controlling the pressure of an auxiliary pressure source (61).

3. A hydraulic brake system as claimed in claim 2, wherein the valve means forms the passage means for said second brake circuit in said pressure control valve (1) said valve means being in operative coaxial connection with a piston (54) slidable in an axial bore (55), a first end surface of said piston (54) being adapted to be acted upon by the pressure of an auxiliary pressure source (61) in the direction of opening of said valve means passage within said pressure control valve (1), while a compression spring (50) abuts on a second end surface and counteracts the auxiliary pressure force.

4. A hydraulic brake system as claimed in claim 3, wherein said piston (54) is limited in travel to a predeterminable distance by means of a tappet (35) interconnected to said valve means in the valve passage of the pressure control unit (1).

5. A hydraulic brake system as claimed in claim 3, wherein a normally opened three-way/two-position directional control valve (60) is arranged between the auxiliary pressure source (61) and the pressurizable end surface of the piston (54), which valve can be switched to a closed position by a signal from said slip monitoring electronic means (62).

6. A hydraulic brake system as claimed in claim 5, wherein the three-way/two-position directional control valve (60) is controllable electromagnetically.

7. A hydraulic brake system as claimed in claim 6, wherein the exciter coil of the three-way/two-position directional control valve (60), in terms of function, is connected in parallel to an alarm device indicating a malfunction of the brake slip control apparatus.

8. A hydraulic brake system as claimed in claim 6, wherein the three-way/two-position directional control valve (60) is integrated into the housing of the pressure control valve (1).

* * * * *